United States Patent
Fischer et al.

(10) Patent No.: US 11,453,061 B2
(45) Date of Patent: Sep. 27, 2022

(54) DEVICE AND METHOD FOR CALIBRATING AN UNDERFLOOR WHEELSET LATHE WITHOUT A CALIBRATION WHEELSET

(71) Applicant: Hegenscheidt-MFD GmbH, Erkelenz (DE)

(72) Inventors: Marvin Fischer, Erkelenz (DE); Christian Henk, Erkelenz (DE); John Oliver Naumann, Wassenberg (DE)

(73) Assignee: Hegenscheidt-MFD GmbH, Erkelenz (DE)

( * ) Notice: Subject to any disclaimer, the term of this patent is extended or adjusted under 35 U.S.C. 154(b) by 253 days.

(21) Appl. No.: 16/762,658

(22) PCT Filed: Nov. 16, 2018

(86) PCT No.: PCT/EP2018/081511
§ 371 (c)(1),
(2) Date: May 8, 2020

(87) PCT Pub. No.: WO2019/096971
PCT Pub. Date: May 23, 2019

(65) Prior Publication Data
US 2020/0276649 A1 Sep. 3, 2020

(30) Foreign Application Priority Data
Nov. 17, 2017 (DE) ..................... 10 2017 010 646.0

(51) Int. Cl.
*G01M 99/00* (2011.01)
*B23B 5/32* (2006.01)
*B23Q 9/00* (2006.01)

(52) U.S. Cl.
CPC .............. *B23B 5/32* (2013.01); *B23Q 9/0078* (2013.01); *G01M 99/007* (2013.01); *B23B 2215/36* (2013.01)

(58) Field of Classification Search
None
See application file for complete search history.

(56) References Cited

U.S. PATENT DOCUMENTS 3,203,286 A 8/1965 Dombrowski
4,669,292 A 6/1987 Brinkmann et al.
(Continued)

FOREIGN PATENT DOCUMENTS

CN 101125370 A 2/2008
CN 106078358 A 11/2016
(Continued)

*Primary Examiner* — Peter J Macchiarolo
*Assistant Examiner* — Jermaine L Jenkins
(74) *Attorney, Agent, or Firm* — The Webb Law Firm (57) ABSTRACT

The invention relates to a device (22) for calibrating an underfloor wheelset lathe (3) without a calibration wheelset, comprising; a motor (23) with a rotational axis (D), a friction roller (24), and a measuring bridge (18), wherein the friction roller (24) is connected p a driveshaft of the motor (23). The aim of the invention is to allow a simpler calibration without a calibration wheelset. This is achieved in that the friction roller (24) has an approximately cylindrical frictional surface with a defined nominal diameter. The invention additionally relates to an underfloor wheelset lathe (3) comprising such a device (22) and to a method for calibrating an underfloor wheelset lathe (3).

14 Claims, 7 Drawing Sheets

(56) References Cited

U.S. PATENT DOCUMENTS

| | | | | |
|---|---|---|---|---|
| 4,674,369 A * | 6/1987 | Gutohrlein | ................ | B23B 5/32 |
| | | | | 82/104 |
| 5,277,055 A * | 1/1994 | Pittard | ................ | G01M 99/007 |
| | | | | 73/11.01 |
| 9,446,449 B2 * | 9/2016 | Naumann | ................ | B23B 5/32 |
| 2010/0005935 A1 | 1/2010 | Ross | | |
| 2013/0112052 A1 * | 5/2013 | Reiche | ...................... | B23B 5/32 |
| | | | | 82/105 |

FOREIGN PATENT DOCUMENTS

| | | | | | |
|---|---|---|---|---|---|
| CN | 107344244 A | | 11/2017 | | |
| DE | 4001793 C1 | | 3/1991 | | |
| DE | 0528058 A1 * | | 2/1993 | ............... | B32B 5/28 |
| JP | 2501732 B2 | | 3/1996 | | |
| RU | 2130361 C1 | | 5/1999 | | |
| RU | 2262416 C1 | | 10/2005 | | |

* cited by examiner

DEVICE AND METHOD FOR CALIBRATING AN UNDERFLOOR WHEELSET LATHE WITHOUT A CALIBRATION WHEELSET

CROSS-REFERENCE TO RELATED APPLICATIONS

This application is the United States national phase of International Application No. PCT/EP2018/081511 filed Nov. 16, 2018, and claims priority to German Patent Application No. 10 2017 010 646.0 filed Nov. 16, 2017, the disclosures of which are hereby incorporated by reference in their entirety.

BACKGROUND OF THE INVENTION

Field of the Invention

The invention relates to a device for calibrating an underfloor wheelset lathe without a calibration wheelset, comprising: a motor with a rotational axis, a friction roller and a measuring bridge, with the friction roller being connected to the driveshaft of the motor.

The invention also relates to an underfloor wheelset lathe with such a device.

The invention lastly relates to a method for calibrating an underfloor wheelset lathe.

Description of Related Art

Underfloor wheelset lathes are popular machining devices which are capable of reprofiling wheelsets installed on rail vehicles, i.e. reproducing the original wheel disc profile. In addition to the machining of wheelsets installed on the vehicle, these machines are capable of reprofiling individual wheelsets or wheelsets in bogies.

The underfloor lathes are often equipped with integrated measuring systems, referred to here as measuring devices, which can measure the state of wear of the wheelset or individual wheel to be reprofiled. This measuring device, aside from this advance measurement, is capable of measuring the newly profiled wheelset and assessing whether the generated profile corresponds to the target specification. The measuring device is usually present once per turning support on such underfloor lathes, in order to simultaneously measure the left and right wheel disc. It is often located directly beside the lathe axis on which the turning tool is clamped by means of a quick-change device. Each of these measuring devices is capable of measuring X and Z values in order to evaluate the profile of the wheel disc. Furthermore, measuring rollers are present on such measuring devices in order to determine the diameters of wheelsets which are rotatingly driven along with the measuring rollers. The same technique is also used in mobile wheelset lathes.

In order to calibrate the measuring device of an underfloor lathe, a calibration wheelset is normally used which has a test certificate and serves as a measurement standard. By supplying this calibration wheelset and measuring previously determined geometric features on this calibration wheelset, it can be verified whether the individual axes of the measuring device are set correctly and can therefore deliver correct measurement values.

The operation of calibration wheelsets is, however, very complex due to their size and their weight such that a calibration operation, which possibly comprises a plurality of measurements of the calibration wheelsets, is very complex.

Against this background, the object underlying the invention is to simplify the calibration operation of underfloor wheelset lathes.

SUMMARY OF THE INVENTION

This object is achieved in the case of a device described at the outset in that the friction roller has an approximately cylindrical frictional surface with a defined nominal diameter.

The device serves to calibrate an underfloor wheelset lathe without using a calibration wheelset. The device firstly comprises a motor with a rotational axis and a friction roller, with the friction roller being connected to the driveshaft of the motor. The motor can for example be an electric motor, in particular a servoelectric motor. The device also comprises a measuring bridge. The measuring bridge serves to bridge rails in the transverse direction and to represent a defined nominal dimension in the transverse direction. A motor with a rotational axis and a friction roller are preferably in each case arranged at both ends of the measuring bridge such that two measuring devices can be simultaneously calibrated at opposing sides of the two rails. In particular, the z direction of the measuring devices can be calibrated on the measuring bridge which has been carried out until now by contacting the wheel inner surfaces of a calibration wheelset. The motor serves to drive the friction rollers such that the friction roller rotates about the rotational axis of the motor.

As the friction roller has an approximately cylindrical frictional surface with a defined nominal diameter, the friction roller can replace a calibration wheelset. Since, like a calibration wheelset ("gauge wheelset"), the friction roller also has a defined dimension, in particular a defined diameter, which can be measured during the calibration in order to verify whether the measured value is consistent with the known nominal dimension. The friction roller preferably has a nominal diameter with a tolerance in the range of $\leq 1/100$ mm. The nominal diameter of the friction roller should have narrower tolerances than is usually the case with calibration wheelsets such that a more exact calibration is possible. It can be provided that the friction roller has two or more sections with different nominal diameters. This allows measurements and calibrations with different diameters whereby a plausibility check can take place.

Therefore, it is possible with the device to calibrate the integrated measuring device of underfloor wheelset lathes without needing and having to supply a calibration wheelset.

According to one configuration of the device, it is provided that the device comprises means to detect the rotational position of the motor and/or the friction roller. The detection of the rotational position serves to be able to carry out an exact calibration.

In relation to this configuration, it is further proposed that an incremental encoder, in particular an incremental encoder integrated into the motor is used as the means to detect the rotational position of the motor and/or the friction roller. An incremental encoder allows a particularly precise detection of the rotational position of the motor and/or the friction roller. In addition, an incremental encoder has the advantage that it can deliver the incremental and absolute position values.

According to a further design of the device, it is provided that the friction roller is detachable, in particular it is connected by a clamping set to the driveshaft of the motor. A detachable connection of motor and friction roller has the advantage that the friction roller can be easily exchanged. In this way, different friction rollers can be used. A clamping set allows a particularly convenient exchange of the friction roller here.

According to a further configuration of the device, it is provided that the motor and/or the friction roller are detachably connected to a tool mount of a tool carrier. By the motor and, possibly, the friction roller fastened thereto being mounted on a tool interface, a particularly precise calibration is enabled since tool interfaces typically have a precisely defined position with tight tolerances. In addition, tool interfaces often have standardised interfaces which allow a simple and quick change.

The object is also achieved by an underfloor wheelset lathe with a device according to the invention for calibrating the underfloor wheelset lathe without a calibration wheelset. An underfloor wheelset lathe serves to machine wheelsets of rail vehicles, therefore it typically comprises at least one tool, in particular at least one turning tool.

The object is lastly achieved by a method for calibrating an underfloor wheelset lathe, comprising the following steps: a) providing an underfloor wheelset lathe with a measuring device, b) providing a device to calibrate and c) calibrating the underfloor wheelset lathe, in particular calibrating the measuring system. According to the invention, it is provided that calibration takes place without using a calibration wheelset. By dispensing with the use of a heavy calibration wheelset, the calibration operation can essentially be carried out more quickly and cost-effectively.

Dispensing with a calibration wheelset can for example be achieved in that calibration takes place by a device according to the invention. When using the previously described device, a calibration wheelset can be dispensed with since the friction roller of the device can assume the function of the wheel discs of the calibration wheelset.

According to one configuration of the method, it is provided that the calibration comprises the following partial steps: c1) bringing a friction roller into contact with a measuring roller of the measuring device, c2) driving the friction roller and/or the measuring roller such that the rollers roll off one another, c3) measuring the friction roller, in particular measuring the diameter of the friction roller and c4) calibrating the measuring device taking into account the values measured in step c3).

According to a further configuration of the method, the following steps can lastly be provided: c4a) calibrating the x-axis by contact between the friction roller (24) and a measuring roller (11, 12) and/or c4b) calibrating the z-axis by contact between the measuring bridge (18) and a measuring roller (11, 12).

The device can comprise a dimensional scale, called a measuring bridge, which serves to calibrate the z-axes of the integrated measuring systems. This can for example be attached to the displaceable rail of an underfloor wheelset lathe. Furthermore, the device can comprise a driven measuring roller which can be fitted on the tool interfaces present in the machine and allows a calibration of the same by rolling the diameter measuring device.

Instead of a calibration wheelset, the measuring bridge can therefore be fastened in the machine which is achieved with few hand movements. For example, the measuring bridge can be clamped on the slide rail. Similarly, the diameter measuring device can be installed in the adjacent tool holder of the measuring device to be measured.

The measuring system of the respective machine side can therefore be positioned and calibrated in the z-axis direction on the measuring bridge which until now took place on the inner side of the calibration wheelset. The measuring wheel of the measuring device is calibrated on the diameter measuring device. To this end, the measuring wheel of the measuring device is positioned and pressed onto the driven friction roller so that the friction roller drives the measuring wheel without slippage as soon as it is set into motion. The defined rotation of the friction roller then takes place, which simultaneously drives the measuring wheel without slippage. A comparison of the rotational speeds with simultaneous offsetting of the two diameters involved of friction wheel and measuring wheel therefore enables the calibration of the measuring wheel. Additionally, the contact point of the measuring roller with the friction roller can be used as the x value for calibrating the measuring device.

The invention is characterised in that:
- no calibration wheelset is required which has to be produced in a complex manner and involves excessive handling efforts during calibration.
- a more precise calibration of the machine is possible since the dimensional scale of the measuring standard can be produced and measured more simply.
- secondary efforts to clamp the calibration wheelset are not necessary, such as a storage rack, a crane to introduce the calibration wheelset onto the track in front of the machine etc.
- a quicker calibration of the machine is possible.

BRIEF DESCRIPTION OF THE DRAWINGS

The invention is explained in more detail below on the basis of a drawing merely representing a preferred exemplary embodiment. In the drawing is shown.

DETAILED DESCRIPTION OF THE PREFERRED EMBODIMENTS

Figure 1:
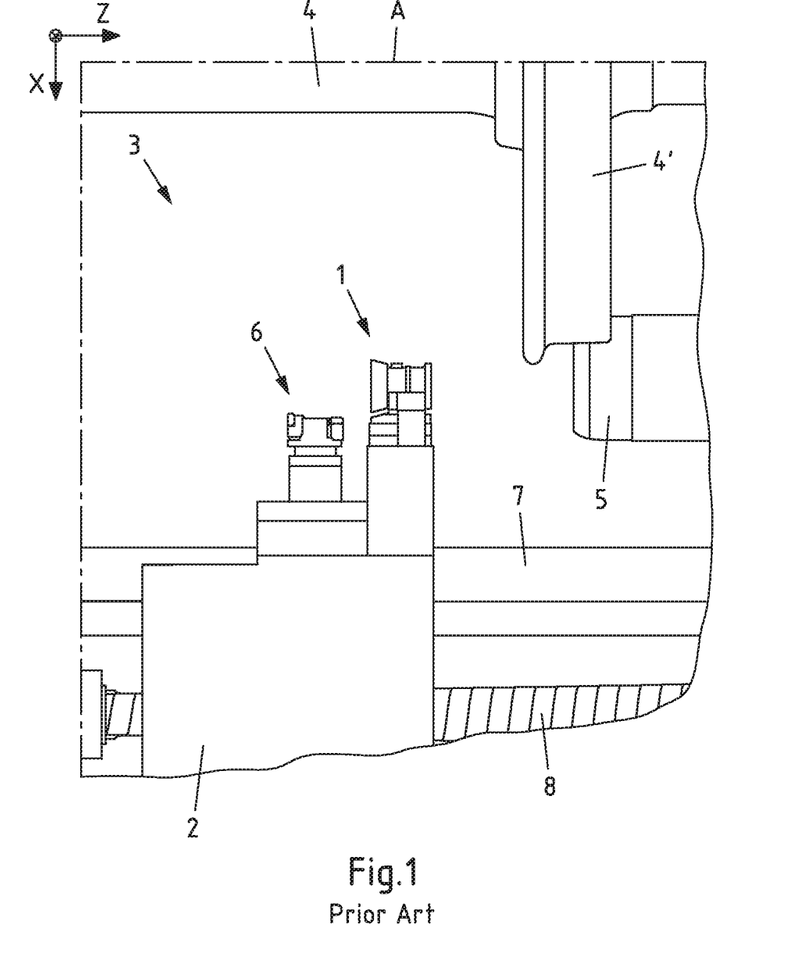
FIG. 1: a measuring device of an underfloor wheelset lathe known from the prior art.

FIG. 1 shows a measuring device 1 known from the prior art which is arranged on a turning support 2 of an underfloor wheelset lathe 3 (represented only partially in FIG. 1). The underfloor wheelset lathe 3 serves to machine a wheelset 4 of a rail vehicle and has a friction roller drive 5 which serves to drive the wheelset 4 via its wheel discs 4' and rotate it about its axis A. A tool carrier 6 is also arranged on the turning support 2 which can receive different tools. The underfloor wheelset lathe 3 also comprises a crossbeam 7, which runs parallel to the axis A of the wheelset 4 and a spindle 8 which also runs parallel to the axis A of the wheelset. A rotation of the spindle 8 leads to a linear displacement of the turning support 2 in the direction of the axis A of the wheelset 4, i.e. parallel to the crossbeam 7.

Figure 2A:
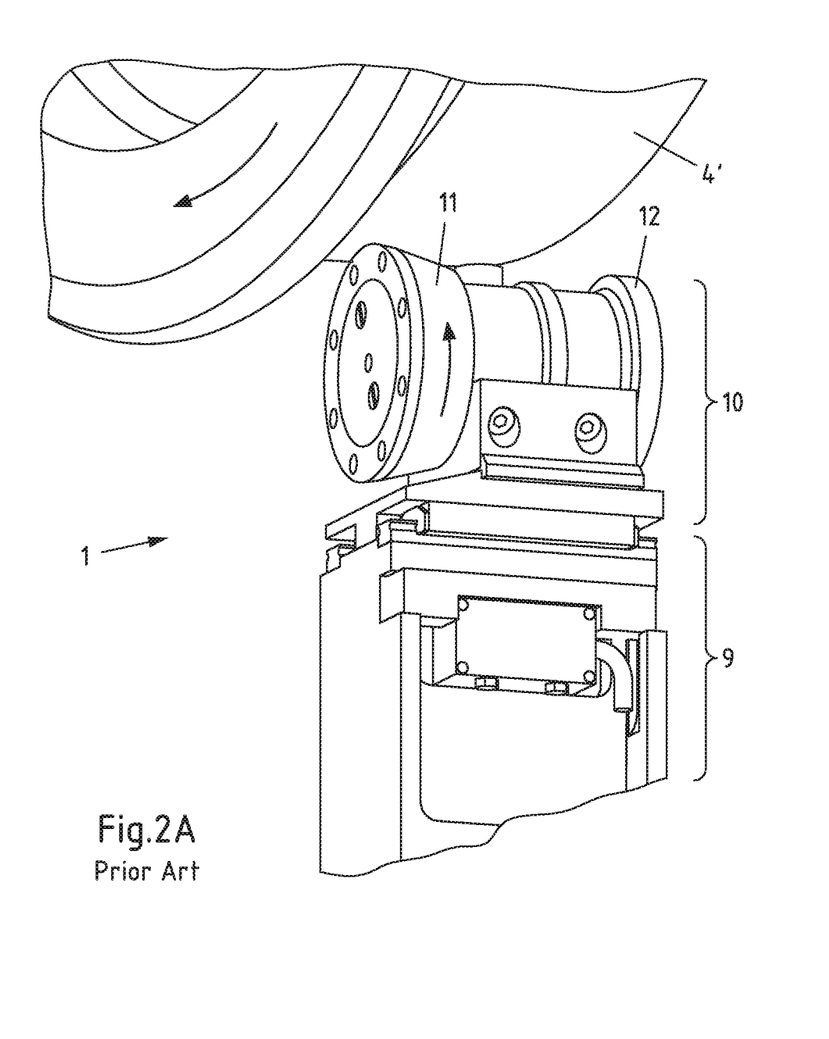
FIG. 2A: the structure of the measuring device from FIG. 1, FIG. 2B: a section through the measuring device from FIG. 2A, FIG. 3: a measuring bridge of a device according to the invention for calibrating an underfloor wheelset lathe on the rail of an underfloor wheelset lathe.

The structure of the measuring device 1 from FIG. 1 is shown in FIG. 2A. Similarly, the wheel disc 4' of the wheelset 4 is represented. The parts already described in relation to FIG. 1 are provided with corresponding reference numerals in FIG. 2A and in all further figures. The measuring device 1 comprises a lower part 9 and a movable upper part 10 which can be slid relative to the lower part 9 along the axis A of the wheelset 4. The lower part 9 can also be slid in the x direction of the machine. The measuring device 1 also comprises a running surface measuring roller 11 and a back measuring roller 12, with both measuring rollers 11, 12 being rotatably supported on the movable upper part 10 of the measuring device 1. More precise detail is given on the structure and the functionality of the measuring device 1 below in relation to FIG. 2B.

Figure 2B:
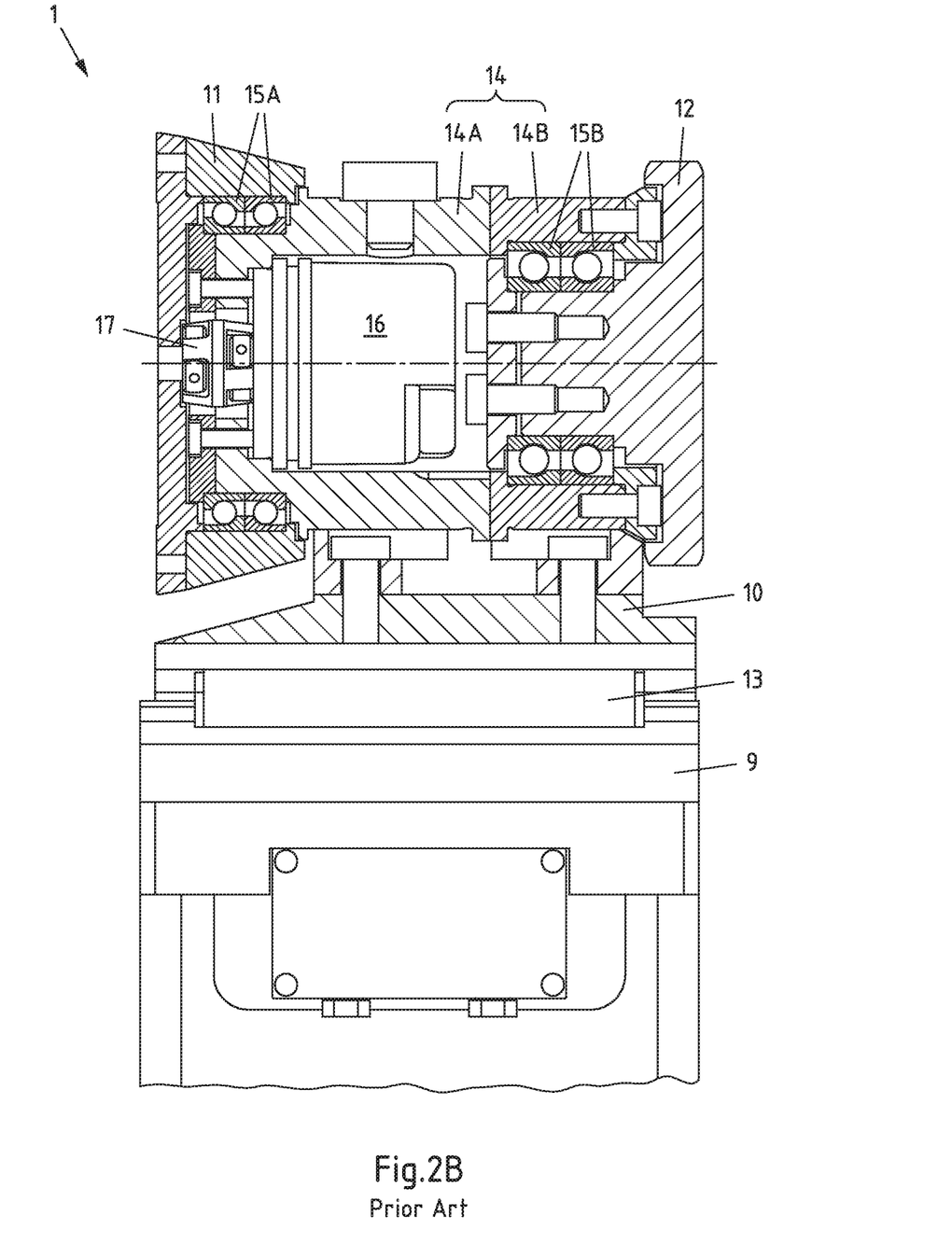

FIG. 2B shows a section through the measuring device from FIG. 2A. The parts already described in relation to FIG. 1 or FIG. 2A are also provided with corresponding reference numerals in FIG. 2B. The movable part 10 is linearly displaceable relative to the lower part 9 which is implemented by a guide 13. The measuring device 1 has a housing 14 which comprises two housing parts 14A, 14B in the configuration represented in FIG. 2A. Both the running surface measuring roller 11 and the back measuring roller 12 are rotatably supported relative to the housing 14, with the running surface measuring roller 11 being rotatably supported by roller bearing 15A with respect to the housing part 14A and with the back measuring roller 12 being rotatably supported by roller bearing 15B with respect to the housing part 14B. The running surface measuring roller 11 and the back measuring roller 12 are rotatably supported independently of one another. The measuring device 1 also has a rotation sensor 16 which is connected to the housing 14 and can be connected via a coupling 17 to the running surface measuring roller 11 and be separated therefrom again.

Figure 3:
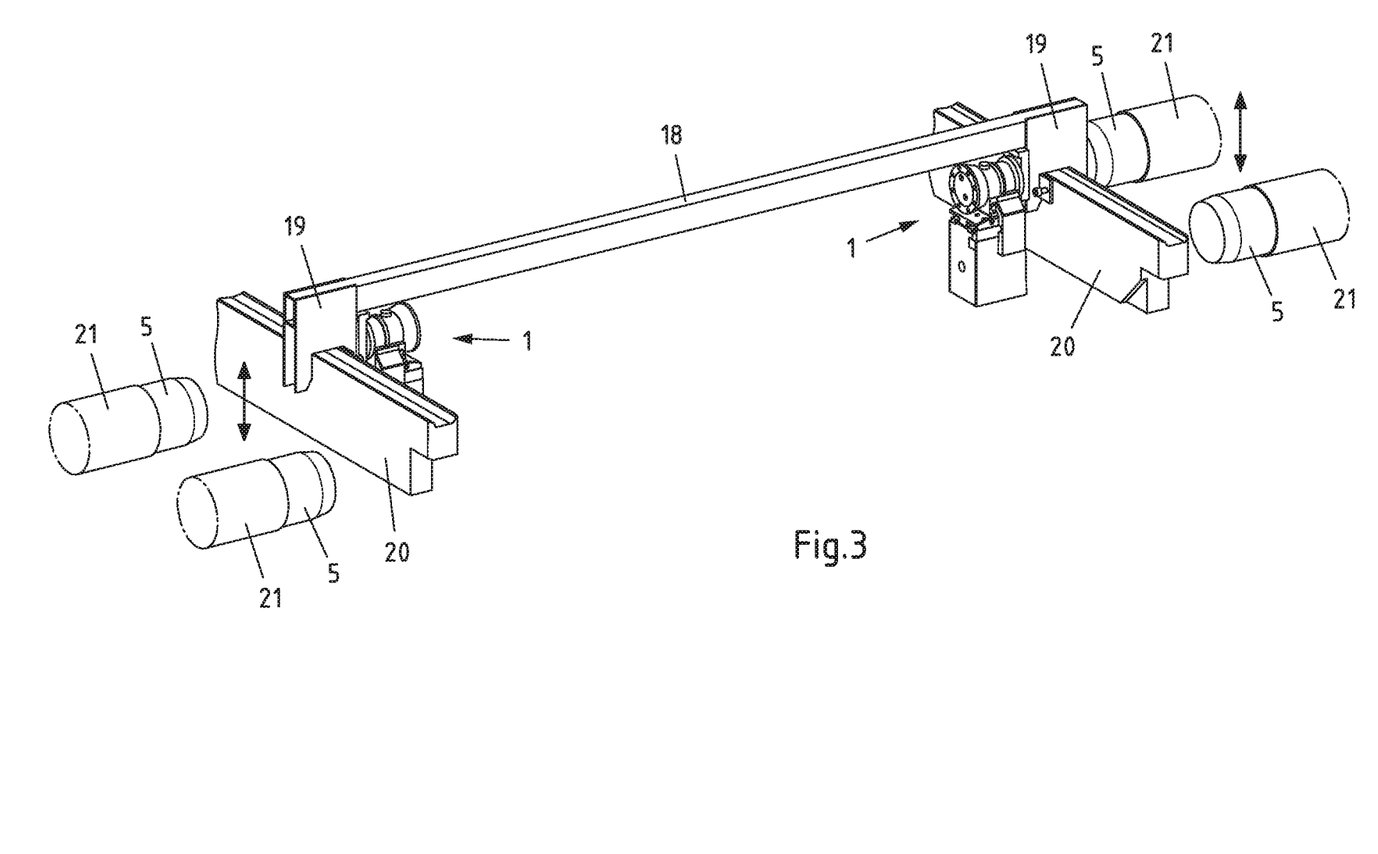

A measuring bridge of a device according to the invention for calibrating an underfloor wheelset lathe is represented in FIG. 3 at the rail of an underfloor wheelset lathe. The parts already described in relation to FIG. 1 to FIG. 2B are also provided with corresponding reference numerals in FIG. 3. The measuring bridge 18 has a support 19 at both ends by means of which the measuring bridge 18 can be slid along slide rails 20. Two of the previously described measuring devices 1 are also represented which are in each case assigned to a slide rail 20. A plurality of roller carriers 21 are also represented, on which the friction roller drives 5 already previously (FIG. 1) described are supported which are displaceably supported in the vertical direction to lift and lower wheelsets (represented by double arrows in FIG. 3).

Figure 4A:
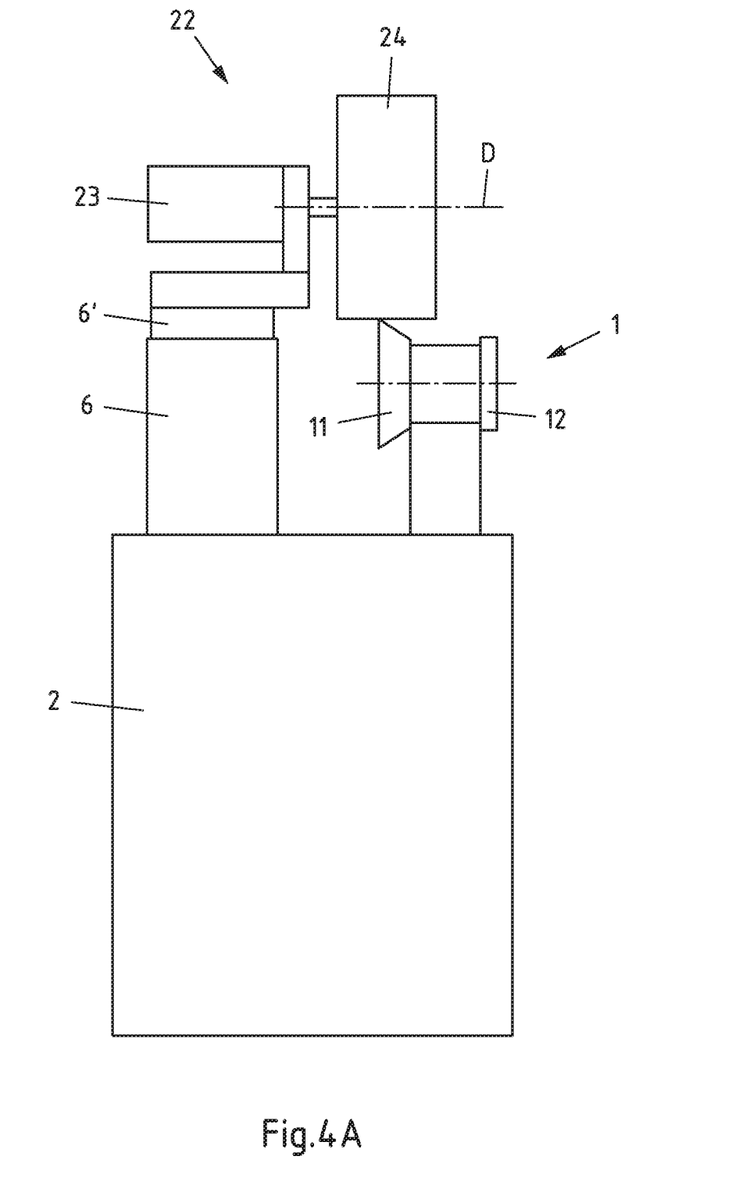
FIG. 4A: a device according to the invention for calibrating an underfloor wheelset lathe in schematic representation.

FIG. 4A shows a device 22 according to the invention for calibrating an underfloor wheelset lathe in a schematic representation. The parts already described in relation to FIG. 1 to FIG. 3 are provided with corresponding reference numerals in FIG. 4A. The device 22 comprises a motor 23 and a friction roller 24 ("measuring roller") which is supported so as to be rotatable about a rotational axis D. The motor 23 can for example be a servoelectric motor. The motor 23 preferably has an integrated incremental encoder to detect the rotational position. The device 22 can be mounted on a tool mount 6' which is arranged on the tool carrier 6. Since tool interfaces have to have very low tolerances, a particularly precise calibration can be achieved by using the tool mount 6'. As already described in relation to FIG. 1, the tool carrier 6, like the measuring device 1, is mounted on the turning support 2. The (calibration) device 22 is mounted such that its friction roller 24 contacts the measuring device 1 and in particular contacts the running surface measuring roller 11 of the measuring device 1. In this way, the measuring device 1 can be calibrated by the device 22 without a calibration wheelset or gauge wheelset being required.

Figure 4B:
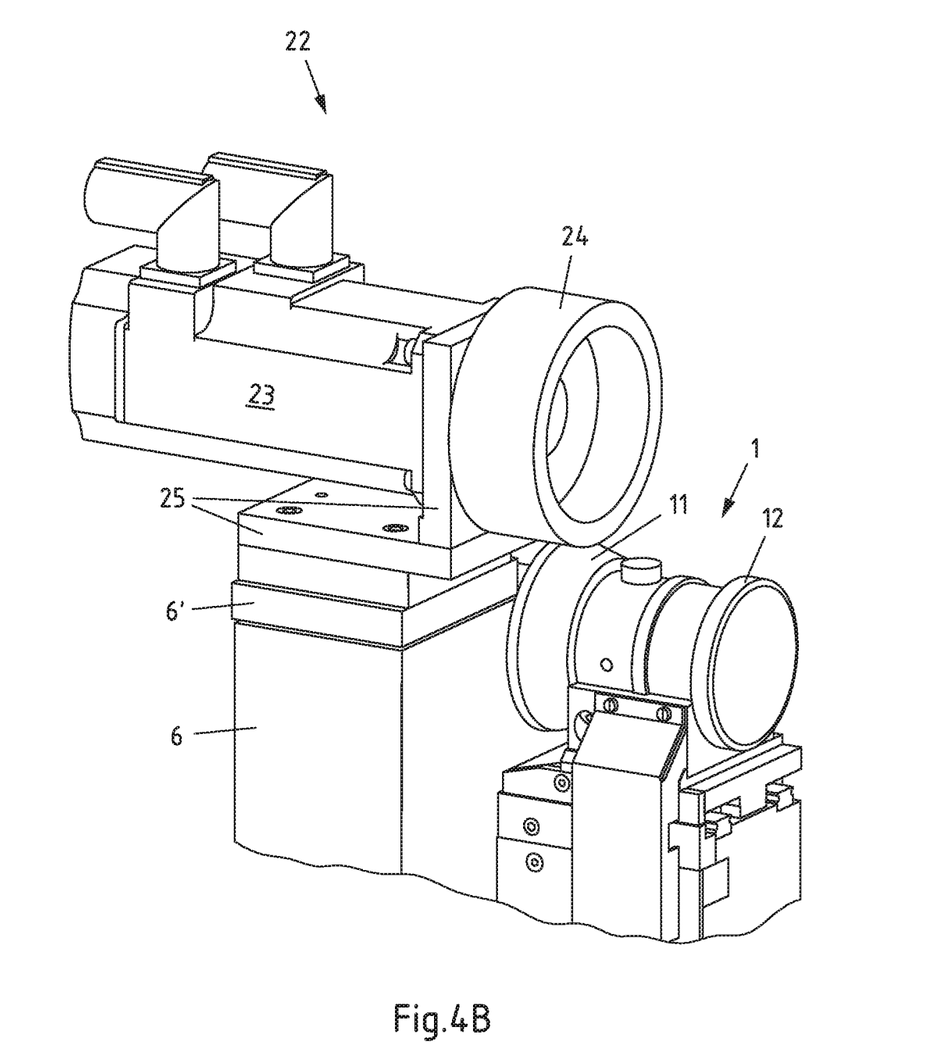
FIG. 4B: the device from FIG. 4A in an enlarged perspective representation.
Figure 4C:
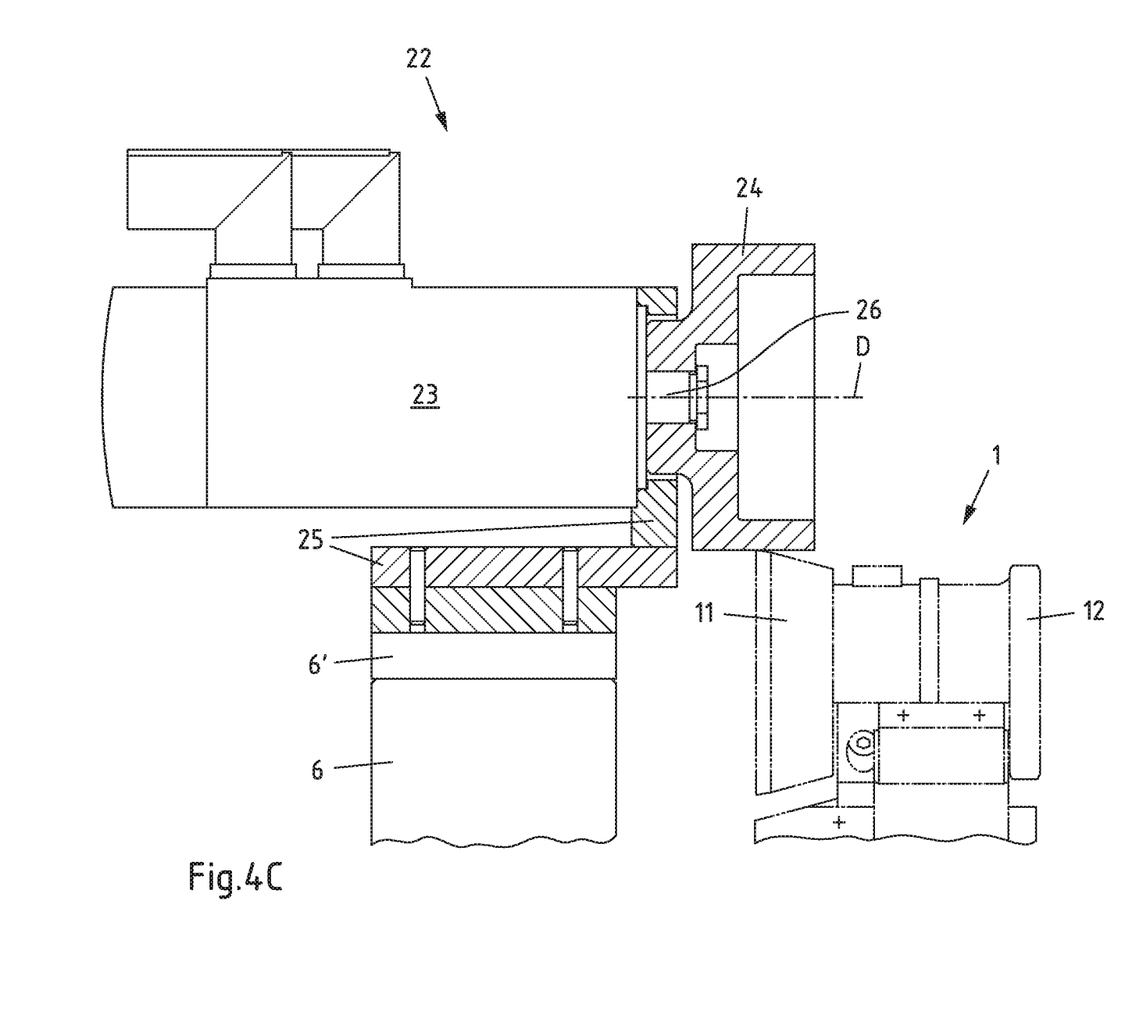
FIG. 4C: a section through the device from FIG. 4B.

The device 22 from FIG. 4A is shown in FIG. 4B in an enlarged, perspective representation. FIG. 4C lastly shows a section through the device 22 from FIG. 4B. The parts already described in relation to FIG. 1 to FIG. 4A are provided with corresponding reference numerals in FIG. 4B and in FIG. 4C. It is discernible in the figures that the friction roller 24 has an approximately cylindrical outer surface which can drive the running surface measuring roller 11 of the measuring device 1 based on friction. The device 22 can, instead of a tool, be mounted on the tool carrier 6 since during calibration a tool (e.g. to machine the wheelset) is not required. The mounting takes place by an angle bracket 25. The friction roller 24 can be connected by a clamping set 26 to the device 22 and separated from it.

LIST OF REFERENCE NUMERALS

1: measuring device
2: turning support
3: underfloor wheelset lathe
4: wheelset
4': wheel disc (of the wheelset 4)
5: friction roller drive
6: tool carrier
6': tool mount
7: crossbeam
8: spindle
9: lower part (of the measuring device 1)
10: upper part (of the measuring device 1)
11: running surface measuring roller
12: back measuring roller
13: guide
14: housing
14A, 14B: housing part
15A, 15B: roller bearing
16: rotation sensor
17: coupling
18: measuring bridge
19: support
20: slide rail
21: roller carrier
22: device for calibrating
23: motor
24: friction roller
25: angle
26: clamping set
A: axis (of the wheelset 4)
D: rotational axis (of the friction roller 24)

The invention claimed is:

1. A device for calibrating an integrated measuring device of an underfloor wheelset lathe without a calibration wheelset, comprising:
a motor with a rotational axis,
a friction roller connected to a driveshaft of the motor, and
a measuring bridge that bridges rails of the underfloor wheelset lathe,
wherein the friction roller has an approximately cylindrical frictional surface with a defined nominal diameter, and
the device comprises means for detecting the rotational position of the motor and/or the friction roller.

2. The device according to claim 1, wherein an incremental encoder is used as the means to detect the rotational position of the motor and/or the friction roller.

3. The device according to claim 2, wherein the incremental encoder is integrated into the motor.

4. The device according to claim 1, wherein the friction roller is detachably connected to the driveshaft of the motor.

5. The device according to claim 4, wherein the friction roller is detachably connected to the driveshaft of the motor by a clamping set.

6. The device according to claim 1, wherein the motor and/or the friction roller are detachably connected to a tool mount of a tool carrier.

7. An underfloor wheelset lathe comprising a device according to claim 1 for calibrating the underfloor wheelset lathe without a calibration wheelset.

8. A method for calibrating an underfloor wheelset lathe, comprising the following steps:
   a) providing an underfloor wheelset lathe with a measuring device,
   b) providing a calibration device, and
   c) calibrating the underfloor wheelset lathe measuring system, wherein the calibration takes place without using a calibration wheelset and in that the calibration comprises the following partial steps:
   c1) bringing a friction roller of the calibration device into contact with a measuring roller of the measuring device,
   c2) driving the friction roller and/or the measuring roller such that the rollers friction roller and the measuring roller roll off one another,
   c3) measuring the friction roller, in particular measuring the diameter of the friction roller, and
   c4) calibrating the measuring device taking into account the values measured in step c3).

9. The method according to claim 8, wherein the friction roller is connected to a motor, and further wherein the calibration step c) includes detecting a rotational position of the motor and/or the friction roller.

10. The method according to claim 8, further comprising the following steps:
   c4a) calibrating the x-axis by contact between the friction roller and the measuring roller,
   c4b) calibrating the z-axis by contact between the measuring bridge and the measuring roller,
   c4c) calibrating the x-axis by contact between the friction roller and a second measuring roller, and/or
   c4d) calibrating the z-axis by contact between the measuring bridge and the second measuring roller.

11. The method according to claim 8, wherein two calibration devices are provided and the friction roller of the first calibration device contacts a first measuring roller and the friction roller of the second calibration device contacts a second measuring roller.

12. The method according to claim 11, wherein the x-axis is calibrated by the first calibration device, and the z-axis is calibrated by the second calibration device.

13. The method according to claim 11, wherein the calibration of the x-axis is performed simultaneously with the calibration of the z-axis.

14. The method according to claim 8, wherein the calibration device comprises:
   a motor with a rotational axis,
   a friction roller connected to a driveshaft of the motor, and
   a measuring bridge that bridges rails of the underfloor wheelset lathe,
   wherein the friction roller has an approximately cylindrical frictional surface with a defined nominal diameter, and
   the device comprises means for detecting the rotational position of the motor and/or the friction roller.

\* \* \* \* \*

UNITED STATES PATENT AND TRADEMARK OFFICE
CERTIFICATE OF CORRECTION

| | |
|---|---|
| PATENT NO. | : 11,453,061 B2 |
| APPLICATION NO. | : 16/762658 |
| DATED | : September 27, 2022 |
| INVENTOR(S) | : Marvin Fischer et al. |

It is certified that error appears in the above-identified patent and that said Letters Patent is hereby corrected as shown below:

On the Title Page

Column 1, Line 11, item (86) delete "Nov. 16," and insert -- Nov. 17, --

In the Claims

Column 7, Line 25, Claim 8, delete "the rollers" and insert -- the --

Signed and Sealed this
Twentieth Day of December, 2022

Katherine Kelly Vidal
*Director of the United States Patent and Trademark Office*